United States Patent [19]
Gilmore et al.

[11] Patent Number: 4,743,304
[45] Date of Patent: May 10, 1988

[54] ASPHALT ANTISTRIPPING AGENTS CONTAINING ORGANIC AMINES AND PORTLAND CEMENT

[75] Inventors: Dennis W. Gilmore, Fairfield; Thomas G. Kugele, Cincinnati, both of Ohio

[73] Assignee: Morton Thiokol, Inc., Chicago, Ill.

[21] Appl. No.: 561,382

[22] Filed: Dec. 14, 1983

[51] Int. Cl.$^4$ .............................................. C08L 95/00
[52] U.S. Cl. ............................ 106/281 N; 106/273 N
[58] Field of Search ........................ 106/281 N, 273 N

[56] References Cited

U.S. PATENT DOCUMENTS

| | | | |
|---|---|---|---|
| 2,361,488 | 10/1944 | Mikeska | 106/281 |
| 2,438,318 | 3/1948 | Johnson | 106/281 |
| 3,819,291 | 6/1974 | McConnaughay | 106/273 N |
| 4,038,102 | 7/1977 | Hellsten et al. | 106/273 N |
| 4,313,895 | 2/1982 | Richmond | 106/273 N |

*Primary Examiner*—Amelia Burgess Yarbrough
*Attorney, Agent, or Firm*—Richard J. Sheridan; Gerald K. White

[57] ABSTRACT

The physical properties of bitumen/aggregate compositions are improved by
 a. adding an antistripping agent selected from imidazolines, polyamines, alkoxylated polyamines, aminocarboxylic esters, amide-amines and mixtures thereof to a bituminous material;
 b. adding Portland cement to an aggregate; and
 c. blending the products of steps a. and b.

14 Claims, No Drawings

ASPHALT ANTISTRIPPING AGENTS CONTAINING ORGANIC AMINES AND PORTLAND CEMENT

BACKGROUND OF THE INVENTION

Unique physical properties and an abundant supply have established asphalt as a major raw material for use in industrial applications which involve structural adhesives and waterproof protective films. The major markets for these industrial applications are road paving and roofing, respectively. Although these two markets have final products that are physically quite different, certain basic similarities do exist. For instance, both asphalt cement and mineral filled roofing asphalt can consist of the combination of asphalt with silica- or limestone-based minerals. Consequently, chemical and physical factors which can influence the asphaltic coating of minerals are operative in both applications.

Residual oils and/or bituminous materials, such as aphalt, used in the preparation of pavements do not coat and adhere well to mineral aggregates unless the aggregate is substantially dry, and, for this reason, in conventional pavements it may be necessary to dry the mineral aggregate prior to blending with the bituminous material.

Mineral aggregates employed in road pavements range in character from hydrophilic to hydrophobic. In general, siliceous and acidic minerals, such as sands and gravels, tend to be hydrophilic while calcareous, alkaline minerals, such as limestone, tend to be more hydrophobic. It has been observed that the mineral aggregates appear to have a greater attraction for water than for oil or bitumens and that it is difficult to obtain complete or satisfactory coating of aggregates by oil or bitumen when water is present. Furthermore, even though satisfactory coating may be obtained by using dry aggregates, the oil or bitumen tends to be displaced if water enters the pavement or road after paving is completed. Compounding these problems is the decrease in the supply of high quality aggregates coupled with the increasing variability of paving asphalts.

One approach which has been used to decrease the severity of the problems attributed to poor adhesion between the aggregate and bitumen and/or stripping of the bitumen from the aggregate due to the presence of moisture has been to include an additive (hereinafter referred to as an antistripping agent) in the bitumen prior to combination with the aggregate. The antistripping agents serve to enhance the coating of the aggregate by bitumens and retard displacement of the aggregate-bitumen bond by water.

The art discloses several antistripping agents which are useful as additives in bitumens and asphalts. For example, U.S. Pat. No. 2,361,488 to L. A. Mikeska, which is hereby incorporated by reference, discloses antistripping agents having the general formula:

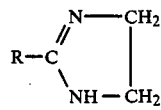

wherein R is either a saturated or unsaturated alkyl group ranging from 10 to 23 carbon atoms.

U.S. Pat. No. 2,386,867 to J. M. Johnson, which is hereby incorporated by reference, discloses antistripping agents which comprise (1) an acylated polyamine in which at least one amino nitrogen has been converted into an amide group by reaction with a high molecular weight carboxylic acid and in which at least one amino nitrogen has been reacted with a high molecular weight carboxylic acid to form an amine soap and (2) an acylated polyamine in which at least two amino nitrogens have been reacted with high molecular weight carboxylic acid to form amine soaps.

U.S. Pat. No. 2,438,318 to J. M. Johnson, which is hereby incorporated by reference, discloses compositions useful as antistripping agents which are salts of acylamidoamines containing at least one free amine group with a freely water soluble acid, the acyl group in the amidoamine being the acyl group of a higher fatty acid and the amine group which is reacted with the water soluble acid (to form the salt) being unsubstituted.

Another method used to prevent moisture damage in paving materials is to include specific mineral fillers in the aggregate. The most common fillers are those which are easily hydrated and include calcium hydroxide, Portland cement or combinations thereof.

Despite the use of the above-described organic or inorganic additives, certain paving materials remain susceptible to moisture damage such that additional improvement is desirable.

SUMMARY OF THE INVENTION

It has now been discovered that unexpected improvements in resistance to moisture damage in bitumen/aggregate compositions are achieved when treatment of the aggregate with Portland cement is combined with treatment of the bitumen with an organic amine antistripping agent. The combination of these treatments has a synergistic effect which produces physical properties in paving materials which are superior to those achieved by either treatment alone, and are also superior to the physical properties which would be expected by combining these treatments.

DETAILED DESCRIPTION OF THE PREFERRED EMBODIMENTS

In accordance with this invention there is provided a process for improving paving materials' physical properties and resistance to moisture damage by treating an aggregate with Portland cement, treating a bituminous material with an organic amine antistripping agent, and blending the two treated materials together.

This invention further provides materials suitable as paving materials comprising the product produced by the process of treating an aggregate with Portland Cement, treating a bituminous material with an organic amine antistripping agent, and blending the two treated materials together.

It is important to note that the improvements in physical properties and resistance to moisture damage provided by this invention are not observed when all known mineral additives are employed in accordance with the invention. For instance, these improvements are not observed when mineral additives such as fly ash, hydrated lime or limestone dust are employed. Rather, these improvements are observed only when Portland cement (Types I, II and III) is used to treat the aggregate, and organic amine antistripping agents which belong to the imidazoline, polyamine, alkoxylated polyamine, aminocarboxylic esters, or amide-amine categories are employed to treat the bitumen.

The imidazoline antistripping agents useful in the practice of this invention are compounds containing an imidazoline ring, i.e.:

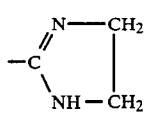

These imidazoline antistripping agents include, but are not limited to, those disclosed in U.S. Pat. No. 2,361,488 having the formula:

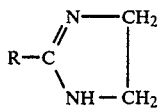

wherein R is a saturated or unsaturated alkyl group having from about 10 to about 23 carbon atoms.

The polyamine antistripping agents useful in the practice of this invention are organic compounds containing two or more amino nitrogen atoms which are separated from each other by at least two carbon atoms or mixtures of such compounds. These polyamines include, but are not limited to, compounds having the formulas:

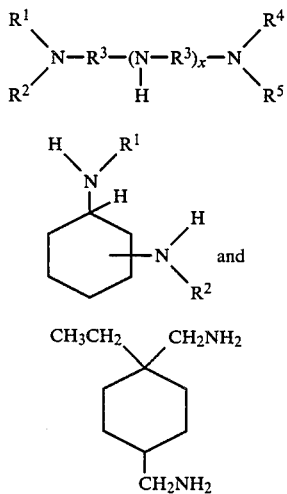

wherein $R^1$, $R^2$, $R^4$ and $R^5$ are each independently —H or —CH$_2$CH$_2$CH$_2$NH$_2$;
$R^3$ is straight or branched chain alkylene of at least 2 carbon atoms, or a straight or branched chain alkylene of at least 2 carbon atoms substituted with —R$^6$—NH$_2$ where $R^6$ is straight or branched chain alkylene of at least 2 carbon atoms; x=0–4.

The polyamines which are useful in the practice of this invention have a Base Value of about 400 to about 965 and a Primary Amine No. of about 150 to about 965. Base Value and Primary Amino No. are calculated as follows:

$$\text{Base Value} = \frac{(56.1)(\text{meq. HCl})}{\text{weight of sample in grams}}$$

$$\text{Primary Amine No.} = \frac{(56.1)(\text{meq. sodium methylate})}{\text{weight of sample in grams}}$$

In the above formulas, 56.1 represents the molecular weight of potassium hydroxide and is a common factor used in the industry to relate Base Value, Acid Values and Primary Amine Numbers to the common units of mgram KOH/gram of sample. In the Base Value formula, the meq. HCl denotes the amount of HCl required to titrate a solution of the sample to a bromphenol blue endpoint. In the determination of Primary Amine No., the sample is first reacted with 2,4-pentanedione and then titrated with a sodium methylate solution.

The preferred polyamines which may be used in the practice of this invention are hexamethylenediamine (HMD) and bis hexamethylenetriamine (BHMT). A particularly preferred polyamine is a by-product from the commercial production of HMD. HMD is produced commercially by one of two general processes, which are represented schematically as follows:

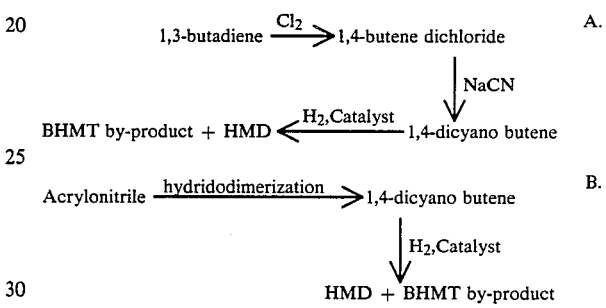

The BHMT by-product is recovered as the bottoms from the distillation of the hydrogenation product in each process. The BHMT by-product, also referred to herein as crude BHMT, typically contains the following components and has the typical Primary Amine Numbers and Base Values indicated below:

| COMPONENT | Process A By-Product | Process B By-Product |
| --- | --- | --- |
| HMD | 0.1–3%* | 0.5–14% |
| NH$_2$(CH$_2$)$_5$—C≡N | 4–20% | 0.01–5.0% |
| 4-(aminomethyl)-1-ethyl-1-(aminomethyl)cyclohexane structure | 8.5–38% | 1.5–3.5% |
| Adiponitrile | 2.5–15% | — |
| BHMT | 12–45% | 41–85% |
| H$_2$N—(CH$_2$)$_5$C(O)NH$_2$ | 1–6.5% | — |
| Primary Amine No. | 180–387 | 336–458 |
| Base Value | 406–603 | 589–788 |

*All percentages are by weight based on the weight of the by-product.

The alkoxylated polyamine antistripping agents useful in the practice of this invention are organic compounds containing two or more amino nitrogen atoms which are separated from each other by at least two carbon atoms, and at least one of the nitrogen atoms has at least one 2-hydroxyalkyl bonded to it. Thus, these alkoxylated polyamines include, but are not limited to, compounds having the formulas:

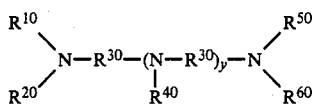

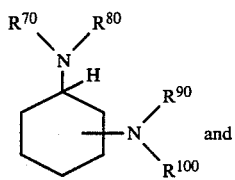

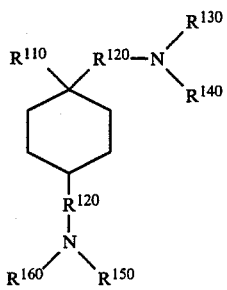

wherein $R^{10}$, $R^{20}$, $R^{40}$, $R^{50}$, $R^{60}$, $R^{70}$ and $R^{90}$, are each independently —H,

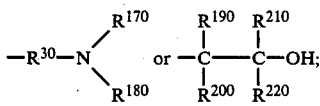

$y = 0$ or $1-4$;

$R^{30}$ is straight or branched chain alkylene of at least 2 carbon atoms, or a straight or branched chain alkylene of at least 2 carbon atoms substituted with —$R^{60}$—$NH_2$ where $R^{60}$ is straight or branched chain alkylene of at least 2 carbon atoms;

$R^{80}$, $R^{100}$, $R^{130}$, $R^{140}$, $R^{150}$, $R^{160}$, $R^{170}$, $R^{180}$ are each —H or

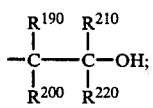

$R^{120}$ is straight or branched chain alkylene of at least 2 carbon atoms; $R^{110}$ is —H, alkyl $R^{190}$, $R^{200}$, $R^{210}$ and $R^{220}$, are each independently —H, alkyl, alkenyl, aryl, alkaryl or aralkyl;

with the proviso that at least one of $R^{10}$, $R^{20}$, $R^{50}$, $R^{60}$, $R^{70}$, $R^{80}$, $R^{90}$, $R^{100}$, $R^{130}$, $R^{140}$, $R^{150}$, $R^{160}$, $R^{170}$, and $R^{180}$ is

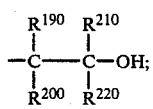

The aminocarboxylic ester antistripping agents useful in the practice of this invention are organic compounds containing at lease one amino nitrogen atom having attached thereto at least one organic radical containing an ester group. These aminocarboxylic esters may be represented by the formula

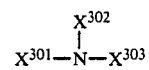

wherein $X^{301}$, $X^{302}$ and $X^{303}$ are each independently

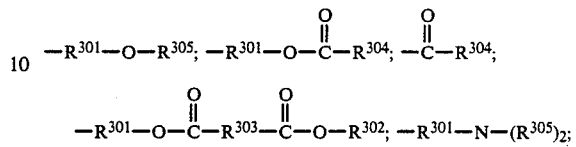

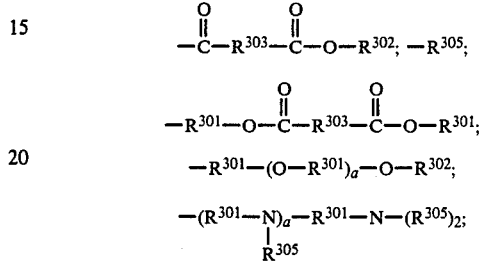

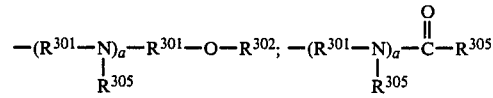

or —H with the proviso that at least one of $X^{301}$, $X^{302}$ or $X^{303}$ is

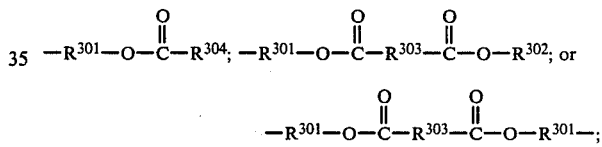

$R^{301}$ is alkylene (e.g. $C_1$-$C_{25}$ alkylene); cycloalkylene (e.g. cyclohexylene); arylene (e.g. phenylene or naphthylene); alkylene, cycloalkylene or arylene substituted by hydroxyl, hydrocarbyl or ester; or forms a 5 or 6-membered ring containing at least one nitrogen atom and carbon atoms with or without oxygen atoms and can be substituted by $R^{305}$, illustrative ring systems being morpholine, piperizine, piperidine and imidazoline;

$R^{302}$ is —H; alkyl (e.g. $C_1$-$C_{25}$ alkyl); cycloalkyl (e.g. cyclohexyl); aryl (e.g. phenyl or naphthyl); alkaryl (e.g. tolyl); aralkyl (e.g. benzyl); alkyl, cycloalkyl or aryl substituted by hydroxyl, or ester; or forms a 5 or 6-membered ring containing at least one nitrogen atom and carbon atoms with or without oxygen atoms and can be substituted by $R^{305}$, illustrative ring systems being morpholine, piperizine, piperidine and imidazoline;

$R^{303}$ is alkylene (e.g. $C_1$-$C_{25}$ alkylene); cycloalkylene (e.g. cyclohexylene); arylene (e.g. phenylene or naphthylene), —CH=CH—; or alkylene, cycloalkylene or arylene substituted by hydroxyl, hydrocarbyl or ester; or forms a 5 or 6-membered ring containing at least one nitrogen atom and carbon atoms with or without oxygen atoms and can be substituted by $R^{305}$, illustrative ring systems being morpholine, piperizine, piperidine and imidazoline;

$R^{304}$ is alkenyl e.g. $C_2$-$C_{20}$ alkenyl; alkyl (e.g. $C_1$-$C_{25}$ alkyl); cycloalkyl (e.g. cyclohexyl); aryl (e.g. phenyl or naphthyl); alkaryl (e.g. tolyl); aralkyl (e.g. benzyl); alkenyl, alkyl, cycloalkyl, aryl, alkaryl or aralkyl substituted by hydroxyl or ester; $-R^{301}-(O-R^{301})_a-O-R^{305}$;

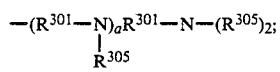

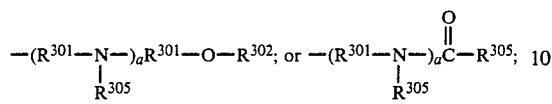

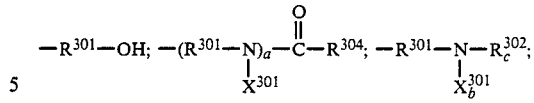

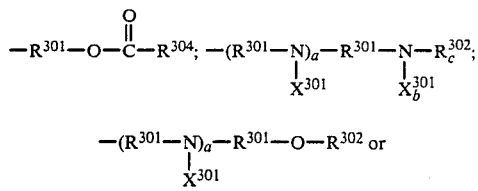

$R^{305}$ is H; alkenyl e.g. $C_2$–$C_{20}$ alkenyl; alkyl ($C_1$–$C_{25}$ alkyl); cycloalkyl (e.g. cyclohexyl); aryl (e.g. phenyl or naphthyl); aralkyl (e.g. benzyl); alkaryl (e.g. tolyl); alkenyl, alkyl, cycloalkyl, aryl, aralkyl or alkaryl substituted with hydroxyl, ester, alkyl imidazoline or alkenyl imidazoline;

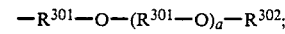

a is 0 or 1 to 6;
b is 0, 1 or 2;
c is 0, 1 or 2;

Examples of aminocarboxylic esters include, but are not limited to, the compounds illustrated in the following table:

$$X^{301}-\underset{\underset{X^{303}}{|}}{\overset{\overset{X^{302}}{|}}{N}}$$

| COMPOUND NO. | $X^{301}$ | $X^{302}$ | $X^{303}$ |
|---|---|---|---|
| 1. | $-CH_2CH_2O\overset{O}{\overset{\|}{C}}C_{17}H_{33}$ | $-CH_2CH_2OH$ | $CH_2CH_2OH$ |
| 2. | $-CH_2CH_2O\overset{O}{\overset{\|}{C}}C_{17}H_{33}$ | $-CH_2CH_2O\overset{O}{\overset{\|}{C}}C_{17}H_{33}$ | $-CH_2CH_2O\overset{O}{\overset{\|}{C}}C_{17}H_{33}$ |
| 3. | $CH_3$ | $CH_3$ | $-CH_2CH_2O\overset{O}{\overset{\|}{C}}C_{17}H_{33}$ |
| 4. | $-C_{18}H_{37}$ | $-CH_2CH_2O\overset{O}{\overset{\|}{C}}C_{17}H_{33}$ | $-CH_2CH_2O\overset{O}{\overset{\|}{C}}C_{17}H_{33}$ |
| 5. | $-CH_2CH_2O\overset{O}{\overset{\|}{C}}CH=CH\overset{O}{\overset{\|}{C}}OC_8H_{17}$ | $-CH_2CH_2O\overset{O}{\overset{\|}{C}}CH=CH\overset{O}{\overset{\|}{C}}OC_8H_{17}$ | $-CH_2CH_2OH$ |
| 6. | $-CH_2CH_2O\overset{O}{\overset{\|}{C}}(CH_2)_4\overset{O}{\overset{\|}{C}}OCH_3$ | $-CH_2CH_2O\overset{O}{\overset{\|}{C}}(CH_2)_4\overset{O}{\overset{\|}{C}}OCH_3$ | $-\overset{O}{\overset{\|}{C}}CH_3$ |
| 7. | $-CH_2\underset{CH_3}{\overset{}{C}}HO\overset{O}{\overset{\|}{C}}-C_{17}H_{35}$ | $-CH_2\underset{CH_3}{\overset{}{C}}HO\overset{O}{\overset{\|}{C}}-C_{17}H_{35}$ | $-CH_2\underset{CH_3}{\overset{}{C}}HO\overset{O}{\overset{\|}{C}}C_{17}H_{35}$ |
| 8. | $-CH_2CH_2O\overset{O}{\overset{\|}{C}}C_{17}H_{32}OH$ | $-CH_2CH_2O\overset{O}{\overset{\|}{C}}C_{17}H_{32}OH$ | $-CH_2CH_2OH$ |
| 8a. | $-CH_2\underset{OH}{\overset{CH_3}{C}}H$ | $-CH_2\underset{OH}{\overset{CH_3}{C}}H$ | $-CH_2\underset{O-C-CH_2-C-O-\underset{C_{12}H_{25}}{\overset{C_7H_{15}}{CH}}}{\overset{CH_3}{CH}}$ |
| 9. | $-\overset{O}{\overset{\|}{C}}(CH_2)_6\overset{O}{\overset{\|}{C}}OC_{12}H_{25}$ | $-\overset{O}{\overset{\|}{C}}(CH_2)_6\overset{O}{\overset{\|}{C}}OC_{12}H_{25}$ | H— |
| 10. | $-CH_2CH_2NH\overset{O}{\overset{\|}{C}}C_6H_5$ | $-CH_2CH_2NH\overset{O}{\overset{\|}{C}}C_6H_5$ | $-CH_2CH_2O\overset{O}{\overset{\|}{C}}C_6H_5$ |

$$X^{301}-\underset{\underset{X^{303}}{|}}{\overset{\overset{X^{302}}{|}}{N}}-X^{303}$$

| COMPOUND NO. | $X^{301}$ | $X^{302}$ | $X^{303}$ |
|---|---|---|---|
| 10a. | $CH_3-\overset{\overset{O}{\|\|}}{C}-O-CH_2-(CH_2)_4-CH_2-$ | $-CH_2CH_3$ | $-CH_2CH_3$ |
| 10b. | $CH_3CH_2\underset{\underset{CH_2CH_3}{\|}}{CH}-\overset{\overset{O}{\|\|}}{C}-NH-CH_2\underset{\underset{CH_3}{\|}}{CH}-O-CH_2\underset{\underset{CH_3}{\|}}{CH}-$ | $-CH_2CH_2OH$ | 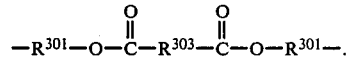 |

The aminocarboxylic ester antistripping agents useful in this invention may also be represented by the formula $$\begin{array}{c}X^{301}\\ \diagdown\\ X^{302}\end{array}N-Y-N\begin{array}{c}\diagup X^{304}\\ \\ \diagdown X^{305}\end{array}$$

wherein Y is $$R^{301}-(\underset{\underset{X^{303}}{|}}{N}-R^{301}-)_a;\ -R_c^{301}-;$$

$$-R^{301}-O-\overset{\overset{O}{\|\|}}{C}-R^{303}-\overset{\overset{O}{\|\|}}{C}-O-R^{301}-;\ -R^{301}+O-R^{301})_a;$$

or forms a five or six-membered ring containing two nitrogen atoms, thereby requiring only one X be attached to each nitrogen atom;

$X^{301}$, $X^{302}$ and $X^{303}$ are as previously defined;

$X^{304}$ and $X^{305}$ are defined the same as $X^{301}$, $X^{302}$ and $X^{303}$;

$R^{301}$ is as previously defined; and a is as previously defined; with the proviso that, if Y is other than $$-R^{301}-O-\overset{\overset{O}{\|\|}}{C}-R^{303}-\overset{\overset{O}{\|\|}}{C}-O-R^{301}-,$$

then at least one $X^{301}$, $X^{302}$, $X^{303}$, $X^{304}$ or $X^{305}$ is $$-R^{301}-O-\overset{\overset{O}{\|\|}}{C}-R^{304};\ -R^{301}-O-\overset{\overset{O}{\|\|}}{C}-R^{303}-\overset{\overset{O}{\|\|}}{C}-O-R^{302}\text{ or}$$

$$-R^{301}-O-\overset{\overset{O}{\|\|}}{C}-R^{303}-\overset{\overset{O}{\|\|}}{C}-O-R^{301}-.$$

In addition to the aminocarboxylic esters illustrated in the table above, the following compounds typify those which may be employed in this invention when Y in the above formula is $$-R^{301}-(\underset{\underset{X^{303}}{|}}{N}-R^{301})_a-\qquad \begin{array}{c}X^{301}\\ \diagdown\\ X^{302}\end{array}N-R^{301}-(\underset{\underset{X^{303}}{|}}{N}-R^{301})_a-N\begin{array}{c}\diagup X^{304}\\ \\ \diagdown X^{305}\end{array}$$

| COMPOUND NO. | $X^{301}$ and $X^{302}$ | $X^{303}$ | $X^{304}$ and $X^{305}$ | $R^{301}$ | a |
|---|---|---|---|---|---|
| 11. | $-CH_2CH_2O\overset{\overset{O}{\|\|}}{C}C_{17}H_{33}$ | — | $-CH_2CH_2O\overset{\overset{O}{\|\|}}{C}C_{17}H_{33}$ | $-CH_2CH_2-$ | 0 |
| 11a. | $-CH_2CH_2OH$ | $-CH_2CH_2OH$ | $-CH_2CH_2O\overset{\overset{O}{\|\|}}{C}-CH_2\\ \ \ \ \ \ \ \ \ \ \ \ \ \ \ \ \ \ \ \ \ \ \ \ \|\\ C_{18}H_{37}-CH-\underset{\underset{O}{\|\|}}{C}OCH_2CH_3$ | $-(CH_2)_6$ | 1 |
| 12. | $-CH_2CH_2O\overset{\overset{O}{\|\|}}{C}C_{17}H_{33}$ | $-CH_2CH_2OH$ | $-CH_2CH_2O\underset{\underset{O}{\|\|}}{C}C_{17}H_{33}$ | $-CH_2CH_2-$ | 1 |
| 13. | $-CH_2CH_2O\overset{\overset{O}{\|\|}}{C}C_{17}H_{33}$ | $-CH_2CH_2O\overset{\overset{O}{\|\|}}{C}C_{17}H_{33}$ | $-CH_2CH_2O\overset{\overset{O}{\|\|}}{C}C_{17}H_{33}$ | $-(CH_2)_2-$ | 6 |
| 14. | $-CH_2\underset{\underset{CH_3}{\|}}{C}HOH$ | $-CH_2\underset{\underset{CH_3}{\|}}{C}HO\overset{\overset{O}{\|\|}}{C}C_{17}H_{33}$ | $-CH_2\underset{\underset{CH_3}{\|}}{C}HOH$ | $-(CH_2)_6$ | 1 |

-continued

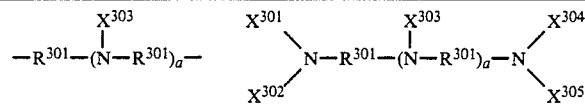

| COMPOUND NO. | $X^{301}$ and $X^{302}$ | $X^{303}$ | $X^{304}$ and $X^{305}$ | $R^{301}$ | a |
|---|---|---|---|---|---|
| 15. | $-\overset{O}{\underset{\|}{C}}C_{11}H_{23}$ and $-H$ | $-CH_2CH_2O\overset{O}{\underset{\|}{C}}C_{17}H_{32}OH$ | $-CH_2CH_2O\overset{O}{\underset{\|}{C}}-C_{17}H_{32}OH$ | $-(CH_2)_4-$ | 1 |
| 16. | $-CH_2CH_2CH_2OH$ | $-CH_2CH_2CH_2OH$ | $-CH_2CH_2CH_2O\overset{O}{\underset{\|}{C}}CH_3$ | $-(CH_2)_6-$ | 1 |
| 17. | $-CH_2CH_2O\overset{O}{\underset{\|}{C}}(CH_2)_4\overset{O}{\underset{\|}{C}}OCH_3$ | $-CH_2CH_2O\overset{O}{\underset{\|}{C}}(CH_2)_4\overset{O}{\underset{\|}{C}}OCH_3$ | $-CH_2CH_2O\overset{O}{\underset{\|}{C}}(CH_2)_4\overset{O}{\underset{\|}{C}}OCH_3$ | $-(CH_2)_6-$ | 1 |
| 18. | $-\overset{O}{\underset{\|}{C}}C_{11}H_{23}$ and $-H$ | — | $-CH_2CH_2O\overset{O}{\underset{\|}{C}}C_{17}H_{32}OH$ | $-(CH_2)_2-$ | 0 |
| 19. | $-CH_2CH_2NH\overset{O}{\underset{\|}{C}}C_6H_5$ | — | $-CH_2CH_2O\overset{O}{\underset{\|}{C}}C_6H_5$ | $-(CH_2)_2-$ | 0 |

The following additional aminocarboxylic esters are illustrative of compounds useful in the practice of the invention when Y in the above formula is $-R^{301}-(OR^{301})-_a$:

The following compounds exemplify the aminocarboxylic esters represented by the above formula wherein Y forms a five or six-membered ring containing two nitrogen atoms:

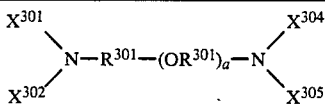

| COMPOUND NO. | $X^{301}$ | $X^{302}$ | $X^{304}$ | $X^{305}$ | $R^{301}$ | a |
|---|---|---|---|---|---|---|
| 20. | $-CH_2CH_2O\overset{O}{\underset{\|}{C}}C_{17}H_{33}$ | Same as $X^{301}$ | Same as $X^{301}$ | $-CH_2CH_2OH$ | $-CH_2CH_2-$ | 1 |
| 21. | $-CH_2CH_2O\overset{O}{\underset{\|}{C}}C_{17}H_{33}$ | Same as $X^{301}$ | $-CH_2CH_2OH$ | $-H$ | $-CH_2CH_2-$ | 1 |
| 22. | $-\overset{O}{\underset{\|}{C}}C_6H_5$ | $-\overset{O}{\underset{\|}{C}}C_6H_5$ | $-CH_2CH_2O\overset{O}{\underset{\|}{C}}CH_3$ | $-CH_2CH_2OH$ | $-CH_2-$ | 6 |
| 23. | $\begin{matrix}-CH_2CH_2\\ \phantom{xxxx}\diagdown\\ \phantom{xxxxxxx}O\\ \phantom{xxxx}\diagup\\ -CH_2CH_2\end{matrix}$ | | $-CH_2CH_2OH$ | $-CH_2CH_2O\overset{O}{\underset{\|}{C}}C_{17}H_{33}$ | $-CH_2CH_2-$ | 0 |
| 24. | $-CH_2CH_2N\overset{O}{\underset{\|}{C}}C_6H_5$<br>$\phantom{xxxxx}\|$<br>$\phantom{xxxxxx}H$ | $-CH_2CH_2NH_2$ | $-CH_2CH_2OH$ | $-CH_2CH_2O\overset{O}{\underset{\|}{C}}C_{17}H_{33}$ | $-(CH_2)_6-$ | 1 |
| 25. | $-CH_2CH_2O\overset{O}{\underset{\|}{C}}(CH_2)_8\overset{O}{\underset{\|}{C}}OCH_2CH_2-$ | | $-CH_2CH_2O\overset{O}{\underset{\|}{C}}(CH_2)_8\overset{O}{\underset{\|}{C}}OCH_2CH_2-$ | | $-(CH_2)_2-$ | 1 |

| COMPOUND NO. | $X^{301}-N-Y-N-X^{304}$ | | RING FORMED BY Y |
|---|---|---|---|
| | $X^{301}$ | $X^{304}$ | |
| 26. | $-CH_2CH_2N(CH_2CH_2O\overset{O}{\underset{\|}{C}}C_{17}H_{33})_2$ | $-CH_2CH_2N(CH_2CH_2OH)_2$ | $-N\begin{matrix}CH_2CH_2\\ \diagdown\\ \diagup\\ CH_2CH_2\end{matrix}N-$ |

-continued

| COMPOUND NO. | $X^{301}$ | $X^{301}-N-Y-N-X^{304}$ $X^{304}$ | RING FORMED BY Y |
|---|---|---|---|
| 27. | $-CH_2CH_2N\begin{matrix}CH_2CH_2OH\\ CH_2CH_2OCC_{17}H_{33}\\ \parallel\\ O\end{matrix}$ | $-CH_2CH_2N(CH_2CH_2OH)_2$ | $-N\begin{matrix}CH_2CH_2\\ \\ CH_2CH_2\end{matrix}N-$ |

The following compounds typify aminocarboxylic esters useful in this invention when Y is the above formula is $$-R^{301}-O-\underset{\underset{O}{\parallel}}{C}-R^{303}-\underset{\underset{O}{\parallel}}{C}-O-R^{301}-.$$

| COMPOUND NO. | $X^{301}$ and $X^{302}$ | $R^{301}$ | $R^{303}$ | $X^{304}$ and $X^{305}$ |
|---|---|---|---|---|
| 28. | $-CH_2CH_2OH$ and $-CH_2CH_2O\underset{\underset{O}{\parallel}}{C}C_{17}H_{33}$ | $-CH_2CH_2-$ | $-(CH_2)_4-$ | $-CH_2CH_2OH$ |
| 29. | $-CH_2CH_2O\underset{\underset{O}{\parallel}}{C}C_{17}H_{33}$ | $-CH_2CH_2-$ | $-(CH_2)_4-$ | $-CH_2CH_2O\underset{\underset{O}{\parallel}}{C}C_{17}H_{33}$ |
| 30. | $-CH_2CH_2OH$ | $-(CH_2)_2-$ | $-(CH_2)_4$ | $-CH_2CH_2OH$ |
| 31. | $-CH_2CH_2O\underset{\underset{O}{\parallel}}{C}C_{17}H_{33}$ | $-(CH_2)_2-$ | ⟨phenyl ring⟩ | $-CH_2CH_2OH$ |

The amide-amine antistripping agents useful in the practice of this invention are polyamines in which at least one of the amino nitrogen atoms is converted to an amide by reaction with a carboxylic acid. Thus, the amide-amines include, but are not limited to, the compositions disclosed in U.S. Pat. No. 2,386,867 which are (1) acylated polyamines in which at least one amino nitrogen has been converted into an amide group by reaction with a high molecular weight carboxylic acid, and in which at least one amino nitrogen has been reacted with a high molecular weight carboxylic acid to form an amine soap; and (2) acylated polyamines in which at least two amino nitrogens have been reacted with high molecular weight carboxylic acid to form amine soap. Also included among the amide-amines useful in the practice of this invention are the compounds disclosed in U.S. Pat. No. 2,438,318, which is hereby incorporated by reference, which are salts of acylamidoamines containing at least one free amine group with a freely water soluble acid, the acyl in the amidoamine being the acyl group of a higher fatty acid and the amine group which is reacted with the water soluble acid, to form the salt, being unsubstituted.

In accordance with the invention, in preparing asphalt/aggregate paving or coating compositions the antistripping agent is added to the asphalt and the Portland cement is added to the aggregate prior to blending of the asphalt with the aggregate. Any convenient method of addition may be employed, provided it results in the antistripping agent being thoroughly and uniformly dispersed in the asphalt, and the Portland cement being dispersed over the surface of the aggregate.

For instance, hand or mechanical mixing is suitable for laboratory specimens. Commercial mixing of antistripping agents and asphalt is best accomplished through blending a stream of the antistripping agent with a stream of the asphalt. This stream blending is most often conducted "in-line" with the use of a baffle system to ensure mixing, or, alternatively, the mixing may be done as the asphalt is being loaded into a transport vehicle. Proper mixing of the Portland cement and aggregate may be accomplished by adding the Portland cement to a conveyor which contains the aggregate, and mixing the two in a heated, rotating cylinder. The final coating or paving compositions may be made by heating the asphalt/antistripping agent blend and combining it with the aggregate/Portland cement blend by either a batch process, e.g. pug mill, or a continuous process, e.g. drum mixer.

Generally, the Portland cement may be added to the aggregate in accordance with this invention in amounts of at least about 0.25% by weight based on the weight of the aggregate, and the antistripping agent may be added to the asphalt in amounts of at least about 0.05% by weight based on the weight of the asphalt. While there is no critical upper limit on the amount of either the Portland cement or the antistripping agent which may be employed, generally using more than about 2.5% by weight of Portland cement, based on the weight of the aggregate, or more than about 1.0% by weight of the antistripping agent, based on the weight of the asphalt, does not produce an improvement in physical properties commensurate with the additional amount of additive employed.

The following examples illustrate this invention. Unless otherwise indicated, in the examples and throughout this specification, all amounts, parts and percentages are by weight.

EXAMPLES 1-29

Several asphalt/aggregate compositions are prepared for evaluation. Each composition contains 5.5% asphalt component (AC-20 asphalt cement) and 94.5% aggregate component (Granite Gneiss). All percentages are by weight based on the total weight of the composition and include the weight of additives, if any are employed.

Each asphalt/aggregate composition is prepared as follows:

1. The aggregate component is prepared by adding the desired amount of additive to the aggregate and stirring the resulting mixture with a laboratory spoon for 2 to 3 minutes. The resulting aggregate/additive mixture is then heated to 325° F. and maintained at that temperature for about 2 hours.

2. The asphalt component is prepared by melting the asphalt and adding thereto the desired amount of antistripping agent. The resulting mixture is stirred for 10 to 15 minutes with a mechanical overhead stirrer.

3. The asphalt/aggregate composition is prepared by heating the asphalt component to about 325° F. and combining it with the proper amount of aggregate component (at 325° F.) to produce a composition containing 5.5% by weight asphalt component and 94.5% by weight aggregate component, based on the total weight of the asphalt/aggregate composition. The resulting mixture is stirred for 2 to 3 minutes with a laboratory spoon during which time the composition is allowed to cool. After thorough mixing, the composition is reheated to about 285° F. and test specimens are prepared using a Marshall compaction device.

The above procedure is followed for several asphalt/aggregate compositions using each in turn of the additives and/or antistripping agents listed in Table I in the amounts indicated in Table I. The resulting specimens are tested according to the State of Georgia test procedure GHD-66. The results are summarized in Table I.

TABLE I

| Example No. | Asphalt Additive[6] | Aggregate Additive[7] | Dry Tensile Strength (psi) | Wet Tensile Strength (psi) |
|---|---|---|---|---|
| 1* | — | — | 89.7 | 11.7 |
| 2* | 0.22% polyamine[1] | — | 94.3 | 69.7 |
| 3* | 0.44% polyamine[1] | — | 85.6 | 76.3 |
| 4* | 1.00% polyamine[1] | — | 94.3 | 93.9 |
| 5* | — | 0.25% Portland cement[2] | 89.1 | 81.1 |
| 6* | — | 0.50% Portland cement[2] | 90.7 | 87.5 |
| 7* | — | 1.0% Portland cement[2] | 92.4 | 92.1 |
| 8 | 0.22% polyamine[1] | 0.25% Portland cement[2] | 110 | 99.5 |
| 9 | 0.22% polyamine[1] | 0.50% Portland cement[2] | 101 | 102 |
| 10 | 0.44% polyamine[1] | 0.50% Portland cement[2] | 117 | 103 |
| 11* | 0.08% alkoxylated polyamine[3] | — | 79.2 | 63.3 |
| 12* | 0.15% alkoxylated polyamine[3] | — | 90.7 | 72.9 |
| 13 | 0.08% alkoxylated polyamine[3] | 0.25% Portland cement[2] | 107 | 94.8 |
| 14 | 0.08% alkoxylated polyamine[3] | 0.50% Portland cement[2] | 112 | 98.0 |
| 15 | 0.15% alkoxylated polyamine[3] | 0.50% Portland cement[2] | 115 | 102 |
| 16* | 0.25% amide amine[4] | — | 89.5 | 50.1 |
| 17* | 0.50% amide amine[4] | — | 98.4 | 75.3 |
| 18 | 0.25% amide amine[4] | 0.25% Portland cement[2] | 114 | 99.3 |
| 19 | 0.25% amide amine[4] | 0.50% Portland cement[2] | 109 | 99.5 |
| 20 | 0.50% amide amine[4] | 0.50% Portland cement[2] | 112 | 105 |
| 21* | 0.08% alkoxylated polyamine[3] 0.25% amide amine[4] | — | 92.3 | 76.4 |
| 22* | 0.08% alkoxylated polyamine[3] 0.22 polyamine[1] | — | 93.7 | 81.6 |
| 23* | 0.25% amide amine[4] 0.22% polyamine[1] | — | 90.2 | 75.8 |
| 24* | 0.22% polyamine[1] | 0.50% fly ash | 89.3 | 72.2 |
| 25* | 0.08% alkoxylated polyamine[3] | 0.50% fly ash | 84.7 | 70.4 |
| 26* | 0.20% amine ester[5] | — | 95.3 | 89.2 |
| 27* | 0.20% amine ester[5] | 0.25% Portland | 115 | 105 |

TABLE I-continued

| Example No. | Asphalt Additive[6] | Aggregate Additive[7] | Dry Tensile Strength (psi) | Wet Tensile Strength (psi) |
|---|---|---|---|---|
| | | cement[2] | | |

*For comparison only.
[1]BHMT by-product
[2]Type I Portland Cement
[3]Ethoxylated BHMT by-product
[4]Amide amine from the reaction of one mole of refined tall oil acid and 1.4 moles of a mixture containing 40% diethylenetriamine and 60% triethylenetetraamine.

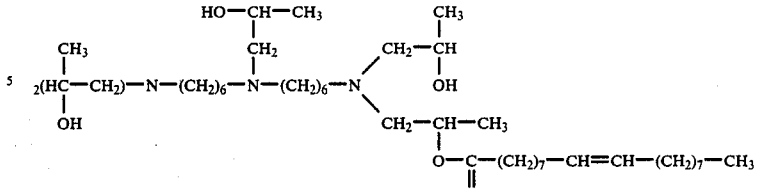

[6]Percentage is weight percent of additive based on the weight of the asphalt.
[7]Percentage is weight percent of additive based on the weight of the aggregate.

The data in Table I clearly demonstrates the improvement in tensile strength realized when an organic amine antistripping agent is employed in the asphalt component and Portland cement is employed in the aggregate component of the asphalt/aggregate compositions. To illustrate this improvement even more clearly, the samples may be divided into the following six categories:

1. Samples containing no additive (abbreviated "NA").
2. Samples containing an organic amine antistripping agent in the asphalt component, but no additive in the aggregate component (abbreviated "OA").
3. Samples containing combinations of organic amine antistripping agents in the asphalt component, but no additive in the aggregate component (abbreviated "COMBO OA").
4. Samples containing Portland cement in the aggregate component, but no antistripping agent in the asphalt component (abbreviated "PC").
5. Samples containing an organic amine antistripping agent in the asphalt additive, and a mineral additive other than Portland cement in the aggregate component (abbreviated "OA/MA").
6. Samples containing an organic amine antistripping agent in the asphalt component and Portland cement in the aggregate component, i.e. the instant invention (abbreviated "OA/PC").

When the tensile strength data from Table I for each of categories 1–6 above are segregated and averaged, without regard to the amount of additive employed in each sample, the results are as indicated in Table II.

TABLE II

| Additive System | Analysis of Results | |
|---|---|---|
| | Avg. Dry Tensile Strength (psi) | Avg. Wet Tensile Strength (psi) |
| NA | 89.7 | 11.7 |
| OA | 90.9 | 73.8 |
| COMBO OA | 92.1 | 77.9 |
| PC | 90.7 | 86.9 |
| OA/MA | 87.0 | 71.3 |
| OA/PC | 111.2 | 100.8 |

What is claimed is:

1. A process for improving the physical properties of bitumen/aggregate compositions, said process comprising:
    a. adding an antistripping agent to bituminous material in an amount at least about 0.05% by weight based on the weight of the bituminous material, said antistripping agent being selected from the group consisting of imidazolines, polyamines, alkoxylated polyamines, aminocarboxylic esters, amide-amines, and mixtures thereof;
    b. adding Portland cement to aggregate in an amount at least about 0.25% by weight based on the weight of the aggregate; and
    c. blending the products of steps a. and b.

2. The process of claim 1 wherein the antistripping agent is an imidazoline compound have the formula:

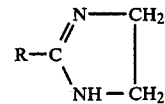

wherein R is a saturated or unsaturated alkyl group having from about 1 to about 23 carbon atoms, or mixtures of such compounds.

3. The process of claim 1 wherein the antistripping agent is a polyamine which is an organic compound containing two or more amino nitrogen atoms which are separated by at least two carbon atoms, or mixtures of such polyamines.

4. The process of claim 3 wherein the antistripping agent is a polyamine having the formula:

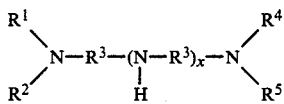

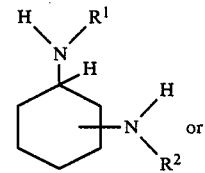 or

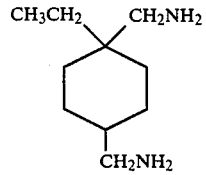

wherein $R^1$, $R^2$, $R^4$ and $R^5$ are each independently —H or —CH$_2$CH$_2$CH$_2$NH$_2$;

$R^3$ is straight or branched chain alkylene of at least 2 carbon atoms, or a straight or branched chain alkylene of at least 2 carbon atoms substituted with —R$^6$—NH$_2$ where R$^6$ is straight or branched chain alkylene of at least 2 carbon atoms; x=0–4; or mixtures of such compounds.

5. The process of claim 1 wherein the antistripping agent is an alkoxylated polyamine which is an organic compound containing two or more amino nitrogen atoms which are separated from each other by at least two carbon atoms, and at least one of the nitrogen atoms has at least one 2-hydroxyalkyl group bonded to it.

6. The process of claim 5 wherein the antistripping agent is an alkoxylated polyamine having the formula:

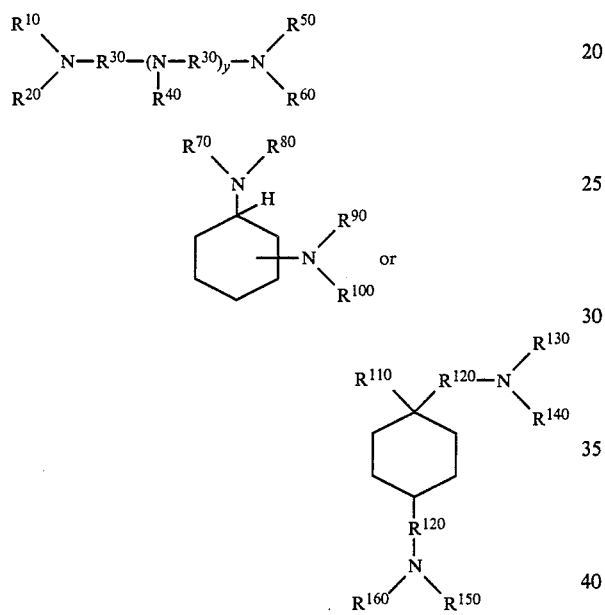

wherein $R^{10}$, $R^{20}$, $R^{40}$, $R^{50}$, $R^{60}$, $R^{70}$ and $R^{90}$, are each independently —H,

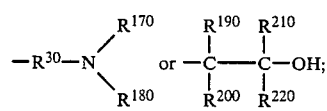

y=0 or 1–4;

$R^{30}$ is straight or branched chain alkylene of at least 2 carbon atoms, or a straight or branched chain alkylene of at least 2 carbon atoms substituted with —R$^{60}$—NH$_2$ where R$^{60}$ is straight or branched chain alkylene of at least 2 carbon atoms;

$R^{80}$, $R^{100}$, $R^{130}$, $R^{140}$, $R^{150}$, $R^{160}$, $R^{170}$, $R^{180}$ are each —H or

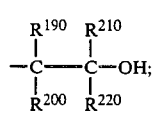

$R^{120}$ is straight or branched chain alkylene of at least 2 carbon atoms; $R^{110}$ is —H, alkyl $R^{190}$, $R^{200}$, $R^{210}$ and $R^{220}$, are each independently —H, alkyl, alkenyl, aryl, alkaryl or aralkyl; with the proviso that at least one of $R^{10}$, $R^{20}$, $R^{50}$, $R^{60}$, $R^{70}$, $R^{80}$, $R^{90}$, $R^{100}$, $R^{130}$, $R^{140}$, $R^{150}$, $R^{160}$, $R^{170}$, and $R^{180}$ is

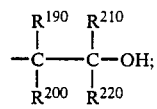

or mixtures of such compounds.

7. The process of claim 1 wherein the antistripping agent is an aminocarboxylic ester which is an organic compound containing at least one amino nitrogen atom having attached thereto at least one organic radical containing an ester group.

8. The process of claim 7 wherein the antistripping agent is an aminocarboxylic ester having the formula:

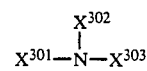

wherein $X^{301}$, $X^{302}$ and $X^{303}$ are each independently

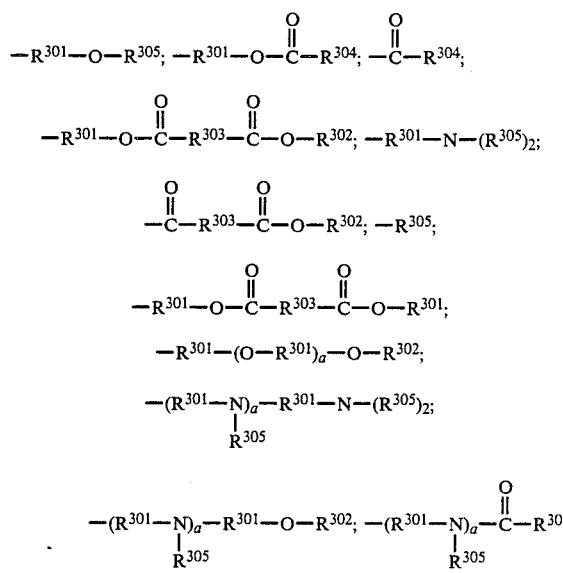

or —H with the proviso that at least one of $X^{301}$, $X^{302}$ or $X^{303}$ is

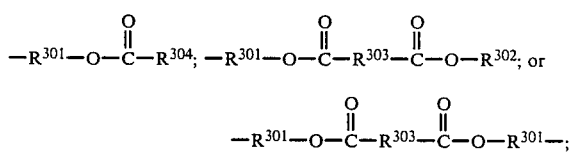

$R^{301}$ is alkylene; cycloalkylene; arylene; or alkylene, cycloalkylene or arylene substituted by hydroxyl, hydrocarbyl or ester; or forms a 5 or 6-membered ring containing at least one nitrogen atom and carbon atoms with or without oxygen atoms and can be substituted by $R^{305}$;

$R^{302}$ is —H; alkyl; cycloalkyl; aryl; alkaryl; aralkyl; alkyl, cycloalkyl or aryl substituted by hydroxyl, or ester; or forms a 5 or 6-membered ring containing at least one nitrogen atom and carbon atoms with or without oxygen atoms and can be substituted by $R^{305}$;

$R^{303}$ is alkylene; cycloalkylene; arylene, —CH=CH—; alkylene, cycloalkylene or arylene substituted by hydroxyl, hydrocarbyl or ester; or forms a 5 or 6-membered ring containing at least one nitrogen atom and carbon atoms with or without oxygen atoms and can be substituted by $R^{305}$;

$R^{304}$ is alkenyl; alkyl; cycloalkyl; aryl; alkaryl; aralkyl; alkenyl, alkyl, cycloalkyl, aryl, alkaryl or aralkyl substituted by hydroxyl or ester; $-R^{301}-(O-R^{301})_a-O-R^{305}$;

$$-(R^{301}-N)_aR^{301}-N-(R^{305})_2;$$
$$\phantom{-(R^{301}-N)_aR^{301}-}|\phantom{xxx}$$
$$\phantom{-(R^{301}-N)_aR^{301}-}R^{305}$$

$$-(R^{301}-N-)_aR^{301}-O-R^{302}; \text{ or } -(R^{301}-N-)_a\overset{O}{\overset{\|}{C}}-R^{305};$$
$$\phantom{-(}|\phantom{xxxxxxxxxxxxxxxxxx}|$$
$$\phantom{-(}R^{305}\phantom{xxxxxxxxxxxxxxx}R^{305}$$

$R^{305}$ is H; alkenyl; alkyl; cycloalkyl; aryl; aralkyl; alkaryl; alkenyl, alkyl, cycloalkyl, aryl, aralkyl or alkaryl substituted with hydroxyl, ester, alkyl imidazoline or alkenyl imidazoline;

$$-R^{301}-OH; \; -(R^{301}-N)_a-\overset{O}{\overset{\|}{C}}-R^{304}; \; -R^{301}-N-R^{302}_c;$$
$$\phantom{-R^{301}-OH; \;-(R^{301}}|\phantom{xxxxxxxxxx}|$$
$$\phantom{-R^{301}-OH; \;-(R^{301}}X^{301}\phantom{xxxxxx}X^{301}_b$$

$$-R^{301}-O-\overset{O}{\overset{\|}{C}}-R^{304}; \; -(R^{301}-N)_a-R^{301}-N-R^{302}_c;$$
$$\phantom{-R^{301}-O-\overset{O}{\overset{\|}{C}}-R^{304}; \;}|\phantom{xxxxxxx}|$$
$$\phantom{-R^{301}-O-\overset{O}{\overset{\|}{C}}-R^{304}; \;}X^{301}\phantom{xxx}X^{301}_b$$

$$-(R^{301}-N)_a-R^{301}-O-R^{302} \text{ or }$$
$$\phantom{-(R^{301}-}|$$
$$\phantom{-(R^{301}-}X^{301}$$

$$-R^{301}-O-(R^{301}-O)_a-R^{302};$$

a is 0 or 1 to 6;
b is 0, 1 or 2;
c is 0, 1 or 2;
or having the formula $$\begin{array}{c}X^{301}\phantom{xxxx}X^{304}\\ \diagdown\phantom{xx}\diagup\\ N-Y-N\\ \diagup\phantom{xx}\diagdown\\ X^{302}\phantom{xxxx}X^{305}\end{array}$$

wherein Y is $$\phantom{R^{301}-(N}X^{303}$$
$$\phantom{R^{301}-(N}|$$
$$R^{301}-(N-R^{301}-)_a; \; -R^{301}-;$$

$$-R^{301}-O-\overset{O}{\overset{\|}{C}}-R^{303}-\overset{O}{\overset{\|}{C}}-O-R^{301}-; \; -R^{301}+O-R^{301}\!\!\overline{\phantom{x}}_a;$$

or forms a five or six-membered ring containing two nitrogen atoms, thereby requiring only one X be attached to each nitrogen atom;

$X^{301}$, $X^{302}$ and $X^{303}$ are as previously defined;
$X^{304}$ and $X^{305}$ are defined the same as $X^{301}$, $X^{302}$ and $X^{303}$;
$R^{301}$ is as previously defined; and
a is as previously defined; with the proviso that, if Y is other than $$-R^{301}-O-\overset{O}{\overset{\|}{C}}-R^{303}-\overset{O}{\overset{\|}{C}}-O-R^{301}-,$$

then at least one $X^{301}$, $X^{302}$, $X^{303}$, $X^{304}$ or $X^{305}$ is $$-R^{301}-O-\overset{O}{\overset{\|}{C}}-R^{304}; \; -R^{301}-O-\overset{O}{\overset{\|}{C}}-R^{303}-\overset{O}{\overset{\|}{C}}-O-R^{302} \text{ or}$$

$$-R^{301}-O-\overset{O}{\overset{\|}{C}}-R^{303}-\overset{O}{\overset{\|}{C}}-O-R^{301}-;$$

or mixtures of such compounds.

9. The process of claim 1 wherein the antistripping agent is an amide-amine which is a polyamine in which at least one of the amino nitrogen atoms is converted to an amide by reaction with a carboxylic acid, or mixtures of such amide-amines.

10. The product produced by the process of claim 1.

11. The process of claim 1 wherein the antistripping agent is employed in an amount from about 0.05% to about 1.0% by weight based on the weight of the asphalt.

12. The process of claim 1 wherein the Portland cement is employed in an amount from about 0.25% to about 2.5% by weight based on the weight of the aggregate.

13. The product produced by the process of claim 11.

14. The product produced by the process of claim 12.

* * * * *